United States Patent [19]

Minnick

[11] Patent Number: 5,242,967
[45] Date of Patent: Sep. 7, 1993

[54] REINFORCED MOLDING COMPOSITION BASED ON POLY(1,4-CYCLOHEXYLENE DIMETHYLENE TEREPHTHALATE) CONTAINING A HIGH MOLECULAR WEIGHT ALIPHATIC POLYESTER

[75] Inventor: Larry A. Minnick, Bluff City, Tenn.

[73] Assignee: Eastman Kodak Company, Rochester, N.Y.

[21] Appl. No.: 827,666

[22] Filed: Jan. 29, 1992

[51] Int. Cl.5 .............................................. C08L 67/02
[52] U.S. Cl. ................................... 524/411; 524/412; 524/539; 525/444
[58] Field of Search ................ 525/444; 524/411, 412, 524/539

[56] References Cited

U.S. PATENT DOCUMENTS

| | | | |
|---|---|---|---|
| 3,565,852 | 2/1971 | Conix et al. | 260/40 |
| 3,843,615 | 10/1974 | Herwig | 525/444 |
| 4,143,093 | 3/1974 | Ruter | 525/444 |
| 4,212,791 | 7/1980 | Avery | 525/444 |
| 4,223,113 | 9/1980 | Bier et al. | 525/439 |
| 4,223,125 | 9/1980 | Bier et al. | 528/305 |

FOREIGN PATENT DOCUMENTS 0387398  9/1990  European Pat. Off. .

*Primary Examiner*—Patricia A. Short
*Attorney, Agent, or Firm*—John D. Thallemer; William P. Heath, Jr.

[57] ABSTRACT

This invention relates to poly(1,4-cyclohexylenedimethylene terephthalate) (PCT) compositions with improved crystallization characteristics due to the presence of a high molecular weight aliphatic polyester. Specifically, the invention is directed to PCT compositions containing an aliphatic polyester with a number-average molecular weight of at least 8,000.

15 Claims, No Drawings

REINFORCED MOLDING COMPOSITION BASED ON POLY(1,4-CYCLOHEXYLENE DIMETHYLENE TEREPHTHALATE) CONTAINING A HIGH MOLECULAR WEIGHT ALIPHATIC POLYESTER

FIELD OF THE INVENTION

This invention relates to poly(1,4-cyclohexylenedimethylene terephthalate) (PCT) compositions with improved crystallization characteristics due to the presence of a high molecular weight aliphatic polyester. Specifically, the invention is directed to PCT compositions containing an aliphatic polyester with a number average molecular weight of at least 8,000.

BACKGROUND OF THE INVENTION

Polyalkylene terephthalate resins are used for manufacturing fibers, films, and molded articles that have excellent physical properties such as high wear resistance, durability, and heat resistance. The physical properties can be further improved by incorporating reinforcing materials such as glass fibers into polyalkylene terephthalate resin compositions.

An important class of polyalkylene terephthalate resins are the PCT resins based on reactions between 1,4-cyclohexanedimethanol and terephthalic acid or suitable synthetic equivalents. Glass fiber reinforced PCT compositions having high crystallinity have excellent properties with regard to strength, stiffness, and heat resistance. These PCT compositions are particularly suitable for the manufacture of heavy duty molded parts for use in the automotive and electronic industries.

High crystallinity is essential to ensure adequate hardness, strength, and heat resistance at elevated temperatures. In addition, high crystallinity should be arrived at as rapidly as possible to achieve optimum material properties and rapid molding cycles. To ensure adequate crystallinity, PCT compositions generally require mold temperatures of 150° C. or higher. High mold temperatures are possible only with sophisticated molding equipment and require specialized heating means, such as, for example, oil bath heating units which are beyond the equipment capabilities of many mold shops which have only water heated molds. Water heated molds are normally capable of temperatures no higher than about 110° C. Oil heating units, in contrast, are expensive to purchase and to operate.

Crystallization aids have been suggested as a method of promoting crystallization at lower mold temperatures. The use of ester compounds as crystallization aids is described, for example, in European patent application 387,398 and in U.S. Pat. Nos. 3,565,852, 4,223,125 and 4,223,113. European patent application 387,398 discloses the use of aliphatic polyesters as crystallization aids for polyethylene terephthalate compositions. The European application states that faster crystallization rates result from the reaction between the aliphatic polyesters and polyethylene terephthalate. PCT is specifically excluded. U.S. Pat. No. 3,565,852 discloses the use of polyesters with at least partial aliphatic character as crystallization aids. Such polyester crystallization aids are likewise limited to polyethylene terephthalate compositions.

U.S. Pat. No. 4,223,125, issued Sep. 16, 1980, discloses polyalkylene terephthalate compositions which contain an aromatic carboxylic acid ester as a crystallization aid. U.S. Pat. No. 4,223,113, issued Sep. 6, 1980, discloses polyalkylene terephthalate compositions which contain an oligomeric polyester having a maximum number-average molecular weight of 6000. U.S. Pat. No. 4,223,113 specifically teaches away from using oligomeric polyesters having molecular weights in excess of 6,000. In column 8, lines 56 to 63, it states that the oligomer's effectiveness in promoting crystallization decreases with increasing molecular weight, thus, oligomers having molecular weights less than 3,000 are preferred.

In contrast, the present inventor has discovered that the addition of an aliphatic polyester having a number-average molecular weight of at least 8,000 and preferably greater than 22,000 allows a lower mold temperature to be used without impairing the crystallization of poly(1,4-cyclohexylenedimethylene terephthalate) compositions. In addition, the degree of crystallinity necessary to ensure adequate hardness, strength, and heat resistance at elevated temperatures is achieved.

SUMMARY OF THE INVENTION

Accordingly, one object of the present invention is to provide poly(1,4-cyclohexylenedimethylene terephthalate) compositions which have a higher crystallization velocity and higher crystallinity than those already known.

Another object of the invention is to provide poly(1,4-cyclohexylenedimethylene terephthalate) compositions which can be molded more rapidly and at lower temperatures than have been possible heretofore.

Still another object of the invention is to provide poly(1,4-cyclohexylenedimethylene terephthalate) compositions which can be molded at temperatures below about 150° C. and yet retain excellent physical properties.

These and other objects are accomplished herein by a thermoplastic composition which crystallizes rapidly at low temperatures comprising:

(A) a poly(1,4-cyclohexylenedimethylene terephthalate) resin containing repeat units from at least 90 mole percent terephthalic acid and at least 90 mole percent 1,4-cyclohexanedimethanol based on 100 mole percent dicarboxylic acid and 100 mole percent diol, said resin having an inherent viscosity of about 0.5 to about 1.0 dl/g and a melting point of at least 265° C., and (B) about 1 to about 10 percent, based on the weight of (A) and (B), of an aliphatic polyester having an inherent viscosity of at least about 0.35 dl/g and a number-average molecular weight of at least about 8,000.

The present invention also provides a process for injection molding a thermoplastic polyester comprising:

(I) substantially homogeneously blending (A) a poly(1,4-cyclohexylenedimethylene terephthalate) resin containing repeat units from at least 90 mole percent terephthalic acid and at least 90 mole percent 1,4-cyclohexanedimethanol based on 100 mole percent dicarboxylic acid and 100 mole percent diol, said resin having an inherent viscosity of about 0.5 to about 1.0 dl/g and a melting point of at least 265° C., with (B) about 1 to about 10 weight percent, based on the weight of (A) and (B), of an aliphatic polyester having an inherent viscosity of at least about 0.35 dl/g and a number-average molecular weight of at least about 8,000, said aliphatic polyester being free of substituents substantially reactive with said resin under injection molding conditions, and (II) injection molding said blend into molds held at temperatures less than about 120° C.

DESCRIPTION OF THE INVENTION

In the present invention a high molecular weight aliphatic polyester having an inherent viscosity of at least about 0.35 dl/g and a number-average molecular weight of at least 8,000 is used as a crystallization aid for compositions based on poly(1,4-cyclohexylenedimethylene terephthalate). Preferably, the aliphatic polyester, component (B), has an inherent viscosity of at least 0.7 dl/g and a molecular weight of greater than 22,000. The aliphatic polyester is present in a sufficient amount to promote crystallization of the PCT resin and thereby allow molding of the PCT composition at mold temperatures below 150° C. The aliphatic polyester is present in an amount from about 1 to about 10 weight percent of the total PCT composition. Preferably, the aliphatic polyester is present in an amount from 2 to 6 weight percent of the total PCT composition.

The high molecular weight aliphatic polyesters of the present invention, component (B), are comprised of aliphatic dicarboxylic acids and aliphatic glycols. Illustrative of aliphatic dicarboxylic acids which are operative include: adipic acid, glutaric acid, sebacic acid, succinic acid, azelaic acid and cyclohexanedicarboxylic acid. Illustrative of aliphatic glycols which are operative include: ethylene glycol, propanediol, butanediol, hexanediol, neopentyl glycol and cyclohexanedimethanol. Most preferably, the aliphatic dicarboxylic acid is adipic acid and the aliphatic glycol is 1,4-cyclohexanedimethanol. Mixtures of aliphatic dicarboxylic acids and aliphatic glycols may also be used. In addition, aliphatic polyesters of the present invention may contain end-capping agents such as benzoic acid, 2-ethyl hexanoic acid and the like.

The poly(1,4-cyclohexylenedimethylene terephthalate) resin, component (A), of the present invention contains repeat units from at least 90 mole percent terephthalic acid and at least 90 mole percent 1,4-cyclohexanedimethanol based on 100 mole percent dicarboxylic acid and 100 mole percent diol. Poly(1,4-cyclohexylenedimethylene terephthalate) resins useful as component (A) have an inherent viscosity of about 0.5 to about 1.0 dl/g and a melting point of at least 265° C.

The dicarboxylic acid component of the poly(1,4-cyclohexylenedimethylene terephthalate) resin consists of terephthalic acid which may contain up to 10 mole percent, based on the acid component, of other aromatic dicarboxylic acids preferably having 6 to 14 carbon atoms, of aliphatic dicarboxylic acids preferably having 4 to 12 carbon atoms or of cycloaliphatic dicarboxylic acids preferably having 8 to 12 carbon atoms. Examples of such dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, sebacic acid, adipic acid, glutaric acid, azelaic acid and the like.

The diol component of the poly(1,4-cyclohexylenedimethylene terephthalate) resin consists of 1,4-cyclohexanedimethanol which may contain up to 10 mole percent, based on the diol component, of other cycloaliphatic diols preferably having 6 to 15 carbon atoms or aliphatic diols preferably having 3 to 8 carbon atoms. Examples of such diols to be included with 1,4-cyclohexanedimethanol are: diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di(hydroxyethoxy)-benzene, 2,2-bis-(4-hydroxycyclohexyl)-ptopsnr, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

Poly(1,4-cyclohexylenedimethylene terephthalate) resins comprising substantially only 1,4-cyclohexane dimethanol and terephthalic acid monomer units are preferred for use in the present invention since such resins exhibit the best crystallization properties when molded at low temperatures. These resins are commercially available or may be prepared by processes well known in the art. For example, the resins can be prepared by direct condensation of terephthalic acid or ester interchange using dimethyl terephthalate with the selected diol.

The mechanical properties exhibited by the resin compositions of the present invention may be further improved by incorporation of from about 10 to about 50 percent, based on the weight of the total composition, of a reinforcing material. The preferred reinforcing material is glass fibers. Glass fibers suitable for use in the present invention may be in the form of filaments, threads, fibers, or whiskers. Substantially any of the types of glass fibers generally known and/or used in the art are useful in the present invention. Typical types are those described in British Patent No. 1,111,012, U.S. Pat. No. 3,368,995 and German Auslegeschrift No. 2,042,447. Thus, the average length of useful fibers covers a wide range, for example, about 1/16 to about 2 inches (0.16–5.08 cm). The preferred glass fibers have an average length of about 1/16 to about ¼ inch (0.16–0.64 cm).

Glass filaments made of calcium aluminum boron silicate glass, which is relatively free from sodium carbonate, are preferably used. Glass of this type is known as "E" glass; however, where the electrical properties of the reinforced polyesters are not important, other glasses can also be used, for example glass with a low sodium carbonate content which is known as "C" glass. The diameter of the filaments can be in the range from about 0.003 to 0.18 mm, but this is not critical for the present invention. For purposes such as the reduction of warpage of molded parts, the PCT resin may be reinforced with a mixture of glass fibers and a plate-like filler such as mica. Other reinforcing materials such a metal fibers, graphite fibers, aramid fibers, glass beads, aluminum silicate, asbestos, mica, talc and the like may be used in combination with, or in place of the glass fibers.

In addition to the reinforcing material, other additives such as those commonly employed with polyester resins can be added in order to enhance the usefulness of the resins. For example, colorants, mold release agents, antioxidants, tougheners, nucleating agents, ultraviolet light and heat stabilizers, lubricants, flame retardants and the like, can be included herein. All of these additives and the use thereof are well known in the art and do not require extensive discussions. Therefore, only a limited number will be referred to, it being understood that any of these compounds can be used so long as they are sufficiently compatible with the high molecular weight polymer matrix to remain substantially uniformly distributed during customary thermoplastic processing. In addition, these compounds should not deleteriously affect the speed or ease with which the high molecular weight polymer molecules can form themselves into a crystalline array.

A particularly desirable additive has been found to be a flame retardant. A preferred flame retardant is a mixture which comprises about 5-20 weight percent, preferably about 10 to 15 weight percent based on the total composition weight, of an aromatic organic compound having at least one aromatic ring having halogen bonded directly to the aromatic ring. The halogenated compounds are preferably brominated or chlorinated, and most preferably, brominated. The bromine content, when bromine is present, is at least 25% of the weight of the compound, and the chlorine content, when chlorine is present, is at least 40% of the weight of the compound. In addition, the compound should be substantially stable at up to 300° C. and should not cause degradation of the polyester. When the compound contains bromine, the amount of bromine present in the blend should preferably be between 2-12% by weight of blend, and most preferably 5-10%. When the compound contains chlorine, the amount of the chlorine present should preferably be 3-20% by weight of the blend and most preferably 5-12%. Representative of such flame retardant compounds are decabromodiphenyl ether, octabromodiphenyl ether, ethylene bis(tetrabromophthalimide), brominated polystyrene, poly(dibromophenylene oxide), a condensation product of two moles of tetrachloro-cyclopentadiene and one mole of cyclooctadiene, and the like. Polymeric flame retardant compounds may have molecular weights up to 200,000.

The flame retarding mixture further comprises about 2-10 weight percent, preferably about 3-6 weight percent based on the total composition weight, of an antimony compound such as antimony oxide, antimony trioxide, sodium antimonate, powdered antimony, etc., which are commercially available. Preferably the antimony compound is sodium antimonate.

The preparation of the PCT compositions according to the invention, which crystallize rapidly, from a poly(1,4-cyclohexylenedimethylene terephthalate) resin and an aliphatic polyester can be carried out in commercially available mixing equipment. Examples of suitable equipment are kneaders, single screw extruders and twin screw extruders. For example, the PCT compositions of this invention were prepared by extrusion compounding using a 1.5 inch (3.85 cm) Sterling single screw extruder (L/D=36/1) at temperatures of 300° C. It is important to note that the compounding temperature must be at least the melting point of the poly(1,4-cyclohexylenedimethylene terephthalate) resin. The mixture or blend that results may be granulated after the melt has solidified.

The PCT compositions of the present invention may be molded at temperatures below about 120° C. and still develop sufficient crystallinity to display the superior mechanical and chemical properties which make these resins attractive for injection molded articles. Such compositions, therefore, are easily molded without the need for expensive mold heating equipment. The preferred mold temperature of the present compositions is from about 95° C. to about 110° C., since such temperatures can be attained using molding equipment heated by steam or pressurized steam. Even at molding temperatures as low as 95° C., the PCT compositions of the present invention exhibit acceptable crystallinity, and smoothness, as well as excellent strength, stiffness, and heat resistant properties.

The polyester compositions according to the invention are excellent starting materials for the production of moldings of all types by injection molding.

The materials and testing procedures used for the results shown herein are as follows: OC 492AA is a ⅛ inch chopped glass fiber strand which is available from Owens Corning.

Inherent viscosity was measured at 25° C. using 0.50 gram of polymer per 100 ml of a solvent consisting of 60 percent by weight phenol and 40 percent by weight tetrachloroethane.

The invention will be further illustrated by a consideration of the following examples, which are intended to be exemplary of the invention. All parts and percentages in the examples are on a weight basis unless otherwise stated.

EXAMPLE I

A blend containing 51.5% of poly(1,4-cyclohexylenedimethylene terephthalate) resin, 30.0% of OC 492AA glass fiber, 1.0% of stabilizers, 17.0% of a bromine/antimony flame retardant system, and 0.5% of a mold release agent, was prepared by extrusion compounding using a 1.5 inch (3.85 cm) Sterling single screw extruder (L/D=36/1) at a temperature of 300° C. The extrudate was chopped into pellets which were injection molded into tensile and flexural bars using a Boy 50S injection molding machine having a mold cavity temperature of 100° C. The test results are summarized in Table I.

The results in Table I indicate that the blend of Example I has good mechanical and melt stability properties, but does not completely crystallize during injection molding as shown by the presence of a first cycle crystallization peak upon heating using Differential Scanning Calorimetry (DSC).

EXAMPLE II

A blend was prepared and molded as in Example I, except that 3.75% of the poly(1,4-cyclohexylenedimethylene terephthalate) resin was replaced with poly(1,4-cyclohexylenedimethylene adipate) with an inherent viscosity of 0.20 dl/g and a number-average molecular weight of 2148. The test results are summarized in Table I.

The results in Table I indicate that the blend of Example II crystallizes completely during injection molding as shown by the absence of a first cycle crystallization peak upon heating using Differential Scanning Calorimetry. However, the results also indicate that this blend has poorer mechanical and lower melt stability properties than the blend of Example I.

EXAMPLE III

A blend was prepared and molded as in Example I, except that 3.75% of the poly(1,4-cyclohexylenedimethylene terephthalate) resin was replaced with poly(1,4-cyclohexylenedimethylene adipate) with an inherent viscosity of 0.37 dl/g and a number-average molecular weight of 8472. The test results are summarized in Table I.

The results in Table I indicate that the blend of Example III crystallizes completely during injection molding as shown by the absence of a first cycle crystallization peak upon heating using Differential Scanning Calorimetry. In addition, the mechanical and melt stability properties of this blend exceed those of Example I.

EXAMPLE IV

A blend was prepared and molded as in Example I, except that 3.75% of the poly(1,4-cyclohexylenedimethylene terephthalate) resin was replaced with poly(1,4-cyclohexylenedimethylene adipate) with an inherent viscosity of 0.59 dl/g and a number-average molecular weight of 22,463. The test results are summarized in Table I.

The results in Table I indicate that the blend of Example IV crystallizes completely during injection molding as shown by the absence of a first cycle crystallization peak upon heating using Differential Scanning Calorimetry. In addition, the mechanical and melt stability properties of this blend exceed those of Example I.

EXAMPLE V

A blend was prepared and molded as in Example I, except that 3.75% of the poly(1,4-cyclohexylenedimethylene terephthalate) resin was replaced with poly(1,4-cyclohexylenedimethylene adipate) with an inherent viscosity of 0.73 dl/g. The test results are summarized in Table I.

The results in Table I indicate that the blend of Example V crystallizes completely during injection molding as shown by the absence of a first cycle crystallization peak upon heating using Differential Scanning Calorimetry. In addition, the mechanical and melt stability properties of this blend exceed those of Example I.

EXAMPLE VI

A blend containing 47.8% of polyethylene terephthalate resin, 30.0% of OC 492AA glass fiber, 1.7% of stabilizers, 16.0% of a bromine/antimony flame retardant system, 0.5% of a mold release agent, and 4.0% of poly(1,4-cyclohexylenedimethylene adipate) with an inherent viscosity of 0.61 dl/g, was prepared by extrusion compounding using a 1.5 inch (3.85 cm) Sterling single screw extruder (L/D=36/1) at a temperature of 270° C. The extrudate was chopped into pellets which were injection molded into tensile and flexural bars using a Boy 50S injection molding machine having a mold cavity temperature of 95° C. The test results are summarized in Table I.

The results in Table I indicate that the polyethylene terephthalate (PET) blend of Example VI does not completely crystallize during injection molding as shown by the presence of a first cycle crystallization peak upon heating using Differential Scanning Calorimetry. In addition, the melt stability data for Example VI is much worse than any of the examples based on PCT which contain an aliphatic polyester crystallization aid.

TABLE I

| Example | I | II | III | IV | V | VI |
|---|---|---|---|---|---|---|
| Poly(1,4-cyclohexylenedimethylene adipate) | | | | | | |
| (IV-0.20), % | — | 3.75 | — | — | — | — |
| (IV-0.37), % | — | — | 3.75 | — | — | — |
| (IV-0.50), % | — | — | — | 3.75 | — | — |
| (IV-0.73), % | — | — | — | — | 3.75 | — |
| BOY 50S SET TEMPERATURE °C. | 300 | 300 | 300 | 300 | 300 | 270 |
| MOLD SET TEMPERATURE °C. | 100 | 100 | 100 | 100 | 100 | 95 |
| % ASH | 32.4 | 32.8 | 33.2 | 33.7 | 33.6 | |
| IV (after molding) dl/g* | 0.59 | 0.49 | 0.53 | 0.56 | 0.54 | 0.39 |
| DSC (1st cycle) Tch °C. | 137 | — | — | — | — | 124 |
| Tm °C. | 294 | 294 | 292 | 294 | 294 | |
| DSC (2nd cycle) Tg °C. | 91 | 75 | 69 | 79 | 75 | |
| Tch °C. | 135 | 115 | 115 | 123 | 123 | |
| Tm °C. | 295 | 290 | 292 | 294 | 293 | |
| Tcc °C. | 246 | 236 | 235 | 239 | 239 | |
| DENSITY g/cm$^3$ | 1.601 | 1.604 | 1.605 | 1.603 | 1.622 | 1.701 |
| IMPACT TEST-ASTM Test Method D256 | | | | | | |
| 10 MIL NOTCHED IZOD J/m @ 23° C. | 64.08 c | 64.08 c | 64.08 c | 69.42 c | 64.08 c | 85.44 c |
| UNNOTCHED IZOD J/m @ 23° C. | 651.5 c | 550.0 c | 582.1 c | 683.5 c | 614.1 c | 694.2 c |
| FLEXURAL STRENGTH MPa | 174.2 | 156.7 | 174.3 | 171.2 | 174.7 | 178.0 |
| FLEXURAL MODULUS MPA | 8,343 | 8,846 | 8,688 | 8,653 | 8,819 | 10,342 |
| FLEXURAL STRAIN, % | 2.37 | 1.91 | 2.27 | 2.23 | 2.23 | |
| DEFLECTION TO BREAK, mm | 3.32 | 2.67 | 3.16 | 3.11 | 3.13 | |
| HEAT DEFLECTION TEMPERATURE °C. @ 264 psi | 257 | 262 | 261 | 253 | 254 | |
| TENSILE STRENGTH @ BREAK MPa | 126.4 | 119.2 | 130.6 | 131.1 | 134.6 | 145.0 |
| % ELONGATION @ BREAK | 4 | 3 | 4 | 4 | 4 | 4 |
| MELT STABILITY PROPERTIES | | | | | | |
| Melt Exposure Temperature °C. | 300 | 300 | 300 | 300 | 300 | 285 |
| Mn after 0 minutes | 20750 | 20230 | 20850 | 21100 | 18760 | 16370 |
| Mn after 15 minutes | 15220 | 14610 | 15800 | 16340 | 14560 | 10490 |
| Mw after 0 minutes | 39390 | 38680 | 39680 | 39590 | 37640 | 34170 |
| Mw after 15 minutes | 32110 | 29440 | 34200 | 35510 | 32160 | 24260 |

*IV determinations corrected for % Ash
c-complete breaks (Izod impact strength)
Mn-number average molecular weight
Mw-weight average molecular weight
Tch-crystallization peak upon heating
Tm-melting point
Tg-glass transition temperature
Tcc-crystallization peak upon cooling The results in Table I indicate that an aliphatic polyester with a number-average molecular weight of at least 2,000 will function as a crystallization aid for poly(1,4-cyclohexylenedimethylene terephthalate) compositions. However, the data also indicates that PCT compositions containing aliphatic polyesters with a number-average molecular weight of greater than 8,000 display better mechanical and melt stability properties than PCT compositions utilizing lower molecular weight aliphatic polyesters. In fact, Table I indicates that the best balance of mechanical and crystallization properties are obtained in PCT compositions which contain an aliphatic polyester with an inherent viscosity of about 0.73. The results in Table I further indicate that the high molecular weight aliphatic polyesters that act as crystallization aids for PCT compositions provide incomplete crystallization and unsatisfactory melt stability in polyethylene terephthalate (PET) compositions.

Many variations will suggest themselves to those skilled in this art in light of the above detailed description. All such obvious modifications are within the full intended scope of the appended claims.

What is claimed is:

1. A thermoplastic composition which crystallizes rapidly at low temperatures comprising:
   (A) a poly(1,4-cyclohexylenedimethylene terephthalate) resin containing repeat units from at least 90 mole percent terephthalic acid and at least 90 mole percent 1,4-cyclohexanedimethanol based on 100 mole percent dicarboxylic acid and 100 mole percent diol, said resin having an inherent viscosity of about 0.5 to about 1.0 dl/g and a melting point of at least 265° C., and
   (B) 2 to about 10 weight percent, based on the weight of (A) and (B), of an aliphatic polyester consisting essentially of repeat units from an aliphatic dicarboxylic acid selected from the group consisting of adipic acid, glutaric acid, sebacic acid, succinic acid, azelaic acid and cyclohexanedicarboxylic acid, and an aliphatic glycol selected from the group consisting of ethylene glycol, propanediol, butanediol, hexanediol, neopentyl glycol and cyclohexanedimethanol, and having an inherent viscosity of at least about 0.35 dl/g and a number-average molecular weight of at least about 8,000.

2. The composition of claim 1 wherein component (A) additionally contains up to 10 mole percent, based on the acid component, of a dicarboxylic acid selected from the group consisting of aromatic dicarboxylic acids, aliphatic dicarboxylic acids, cycloaliphatic dicarboxylic acids, and mixtures thereof.

3. The composition of claim 2 wherein said dicarboxylic acid is selected from the group consisting of isophthalic acid, phthalic acid, naphthalene-2,6-dicarboxylic acid, cyclohexanedicarboxylic acid, diphenyl-4,4'-dicarboxylic acid, succinic acid, sebacic acid, adipic acid, glutaric acid, azelaic acid and mixtures thereof.

4. The composition of claim 1 wherein component (A) additionally contains up to 10 mole percent, based on the diol component, of a diol selected from the group consisting of aliphatic diols, cycloaliphatic diols, and mixtures thereof.

5. The composition of claim 4 wherein said diol is selected from the group consisting of diethylene glycol, triethylene glycol, ethylene glycol, propanediol, butanediol, pentanediol, hexanediol and mixtures thereof.

6. The composition of claim 1 wherein the aliphatic polyester, component (B), has an inherent viscosity of at least about 0.7 dl/g and a molecular weight of greater than about 22,000.

7. The composition of claim 1 wherein the aliphatic polyester, component (B), is poly(1,4-cyclohexylenedimethylene adipate).

8. The composition of claim 1 wherein the aliphatic polyester, component (B), is present in an amount of from 2 to 6 weight percent based on the total weight of the composition.

9. The composition of claim 1 which additionally contains about 2 percent to about 20 percent, based on the total composition weight, of a halogenated organic compound.

10. The composition of claim 9 which additionally contains up to about 10 percent based on the total composition weight, of an antimony compound.

11. The composition of claim 1 which additionally contains up to about 50 weight percent of a reinforcing material.

12. The composition of claim 11 wherein glass fibers are used as said reinforcing material.

13. The composition of claim 12 wherein said glass reinforcing fibers are selected from the group consisting of filaments, fibers, chopped strands, whiskers and mixtures thereof.

14. The composition of claim 1, further comprising one or more additives selected from the group consisting of colorants, mold release agents, antioxidants, tougheners, nucleating agents, ultraviolet light and heat stabilizers, lubricants, and processing aids.

15. A molded article comprising the composition of claim 1.

* * * * *